United States Patent
Stretcher

(10) Patent No.: US 9,587,777 B1
(45) Date of Patent: Mar. 7, 2017

(54) NURSE TANK COUPLING WITH LOCKING COLLAR

(71) Applicant: CONTINENTAL NH3 PRODUCTS CO., INC., Dallas, TX (US)

(72) Inventor: Judd K Stretcher, Dallas, TX (US)

(73) Assignee: CONTINENTAL NH3 PRODUCTS CO., INC., Dallas, TX (US)

( * ) Notice: Subject to any disclaimer, the term of this patent is extended or adjusted under 35 U.S.C. 154(b) by 264 days.

(21) Appl. No.: 14/335,837

(22) Filed: Jul. 18, 2014

(51) Int. Cl.
*F16L 27/00* (2006.01)
*F16L 37/138* (2006.01)
*F16L 37/14* (2006.01)

(52) U.S. Cl.
CPC .......... *F16L 37/138* (2013.01); *F16L 37/146* (2013.01)

(58) Field of Classification Search
CPC ....... F16L 37/107; F16L 37/24; F16L 37/244; F16L 37/248; F16L 37/138; F16L 37/146; F16L 19/005
USPC ........... 285/92, 133.4, 148.19, 148.21, 148.2
See application file for complete search history.

(56) References Cited

U.S. PATENT DOCUMENTS

| | | | | |
|---|---|---|---|---|
| 5,890,746 A * | 4/1999 | Mueller | ................. | F16L 19/02 285/113 |
| 7,883,117 B2 * | 2/2011 | Marc | ..................... | F16L 19/005 285/354 |

* cited by examiner

*Primary Examiner* — Jason Boeckmann
(74) *Attorney, Agent, or Firm* — Mark W Handley

(57) ABSTRACT

An anhydrous ammonia nurse tank coupling had a locking collar for securing a flow nozzle to a nurse tank fitting. A nipple is threadingly secured to the fitting and has a hexagonal-shaped section. A nozzle coupling extends about said flow nozzle for threadingly securing to the flow nozzle to the nipple. The nozzle coupling and the nipple have acme threads which are secured together, with a seal element extending between the nipple and the flow nozzle. A locking collar slidably disposed on said nozzle coupling, for moving from a retracted position disposed aside of the hexagonal-shaped section of the nipple to an extended position disposed adjacent to the hexagonal-shaped section and non-rotatably securing the locking collar to the nipple. The locking collar is non-rotatably secured to the nozzle coupling in the extended position, and non-rotatably secures the nozzle coupling to the nipple when in the extended position.

12 Claims, 3 Drawing Sheets

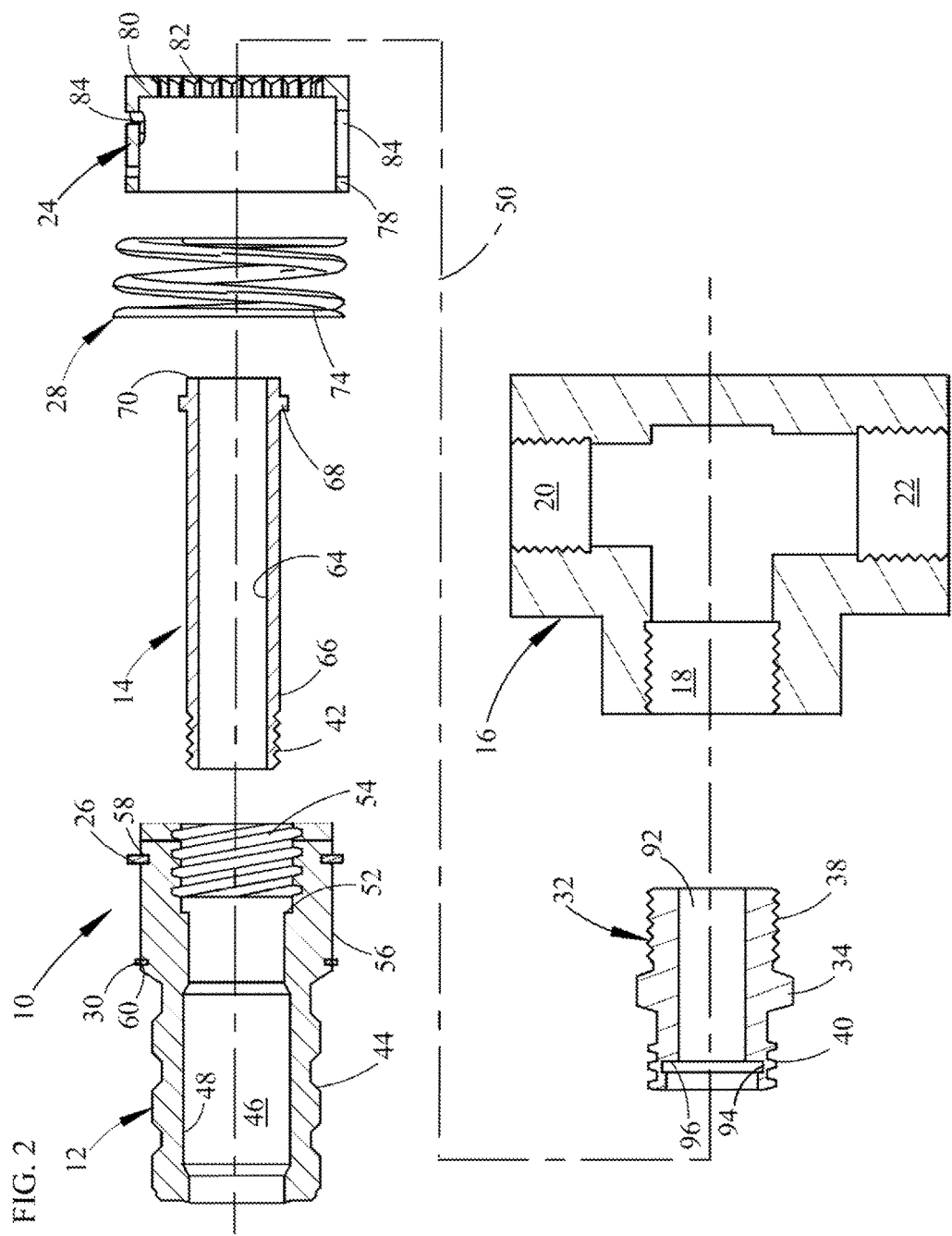

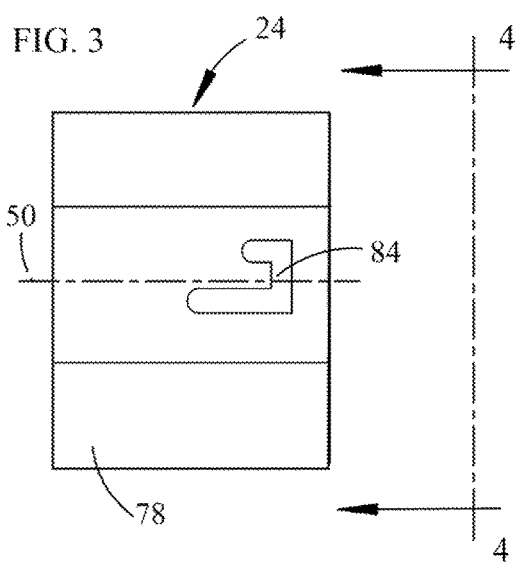
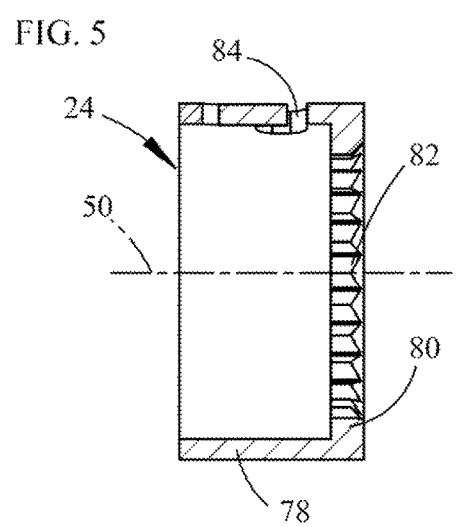
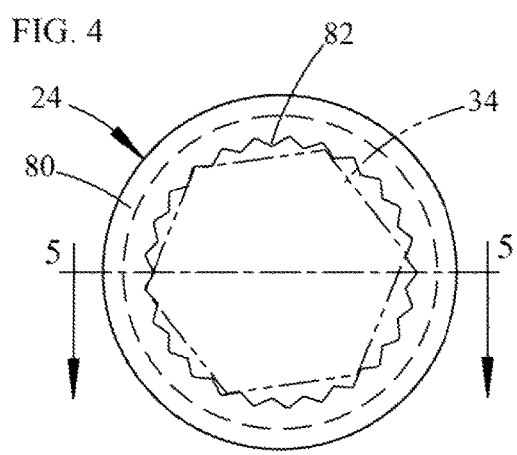

US 9,587,777 B1

NURSE TANK COUPLING WITH LOCKING COLLAR

TECHNICAL FIELD OF THE INVENTION

The present invention relates in general to equipment for injecting anhydrous ammonia into the ground, and in particular to coupling for connecting a supply line between an anhydrous ammonia tank and an injection knife toolbar.

BACKGROUND OF THE INVENTION

Anhydrous ammonia is commonly used as a fertilizer for growing row crops. A wide toolbar with a plurality of injector knives that extend into the ground along the multiple rows is pulled behind a tractor. The injector knives are connected to tubing which extends to one or more control sections where a flow stream of anhydrous ammonia is divided into separate streams for directing to respective ones of the injector knives. A flow hose extends from the one or more control sections to a nurse tank which is also pulled behind the tractor. The nurse tank provides a supply of liquid anhydrous ammonia. A flow nozzle and a flow nozzle coupling are mounted to the terminal end of the hose for connecting to a fitting which is mounted to the nurse tank and provides a flow connector for passing anhydrous ammonia form the nurse tank into the flow hose. The flow nozzle coupling typically has acme threads for connecting to the fitting, and the nozzle coupling is often hand tightened when secured to the fitting for ease of connecting the nurse tank to the tractor and ease of releasing the flow hose from the tractor. Vibration encountered when the tractor, toolbar and nurse tank are moving across a field on occasion causes the nozzle coupling to loosen from the fitting, causing unwanted release of anhydrous ammonia.

SUMMARY OF THE INVENTION

An anhydrous ammonia nurse tank coupling is provided having a locking collar for securing a flow nozzle to a nurse tank fitting. A nipple is threadingly secured to the fitting and has a hexagonal-shaped section. A nozzle coupling extends about said flow nozzle for threadingly securing to the flow nozzle to the nipple. The nozzle coupling and the nipple have acme threads which are secured together, with a seal element extending between the nipple and the flow nozzle. A locking collar slidably disposed on said nozzle coupling, for moving from a retracted position disposed aside of the hexagonal-shaped section of the nipple to an extended position disposed adjacent to the hexagonal-shaped section and non-rotatably securing the locking collar to the nipple. The locking collar is non-rotatably secured to the nozzle coupling in the extended position, and non-rotatably secures the nozzle coupling to the nipple when in the extended position.

DESCRIPTION OF THE DRAWINGS

For a more complete understanding of the present invention and the advantages thereof, reference is now made to the following description taken in conjunction with the accompanying Drawings in which FIGS. 1 through 5 show various aspects for a nurse tank coupling assembly having a coupling with locking collar made according to the present invention, as set forth below:

FIG. 1 is a longitudinal section view of the nurse tank coupling assembly having a nozzle coupling with a locking collar connected to a fitting such as used for connecting an anhydrous nitrogen nurse tank in farming operations;

FIG. 2 is an exploded, longitudinal section of the nurse tank coupling with locking collar and the fitting;

FIG. 3 is a side elevation view of the locking collar;

FIG. 4 is an end view of the locking collar, taken along section line 4-4 of FIG. 3;

FIG. 5 is a longitudinal section view of the locking collar, taken along section line 5-5 of FIG. 4

DETAILED DESCRIPTION OF THE INVENTION

Figure 1:
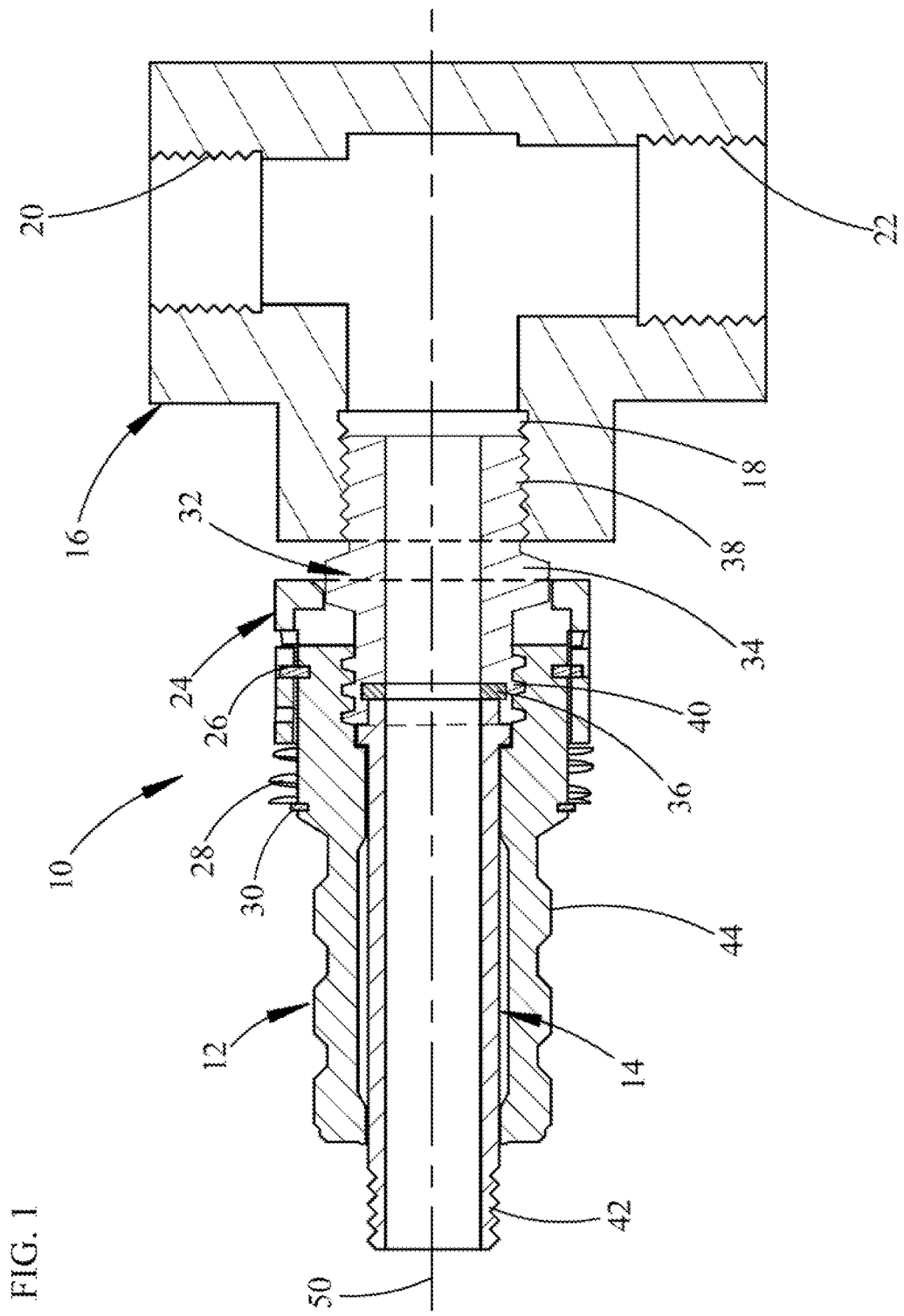

Referring to the Figures, FIG. 1 is a longitudinal section view of a nurse tank coupling assembly 10 having coupling 12 for connecting a flow nozzle 14 to a fitting 16 of a nurse tank such as that used for providing anhydrous ammonia as fertilizer in farming operations. The fitting 16 may be provided by a pipe Tee as shown, a valve housing, or other type connector fitting for connecting a supply line to a nurse tank. The fitting 16 is shown having connector profiles 18, 20 and 22. A locking collar 22 is provided to prevent the coupling 12 from coming loose for the nipple 24. Two pins 26 are shown for fitting in the locating slots 84 and slidably securing the locking collar 24 to the coupling 12. One or more of the pins 26 are used, with preferably two or three pins 26 used according to the number of locating slots 84 used in the locking collar 24. A bias spring 28 provides a bias means for pressing against the end of the locking collar 24 to push the locking collar 24 toward the fitting 16. A retainer ring 30 is preferably provided by a snap ring which provides a retainer member for securing the bias spring between the coupling 12 and the end of the locking collar 22. A nipple 32 has pipe threads 38 on one end and acme threads 40 on the other end. The pipe threads 38 and the connector profile 18 are configured for threadingly securing together with a sealing engagement there-between. A seal element is preferably provided by a flat gasket for sealingly engaging between the terminal end seal seat 70 the nipple 32 and a first end of the flow nozzle 14. The seal element 36 is preferably provided by a flat gasket, but in other embodiments may be provided by an O-ring, or seal elements of other shapes and configurations, preferably formed of elastomeric materials or of thermoplastic materials. Preferably, the coupling 12, the flow nozzle 14, the spring 28, the locking collar 24, the nipple 32, and the connector profile 18 of the fitting 16 are concentrically disposed about a central longitudinal axis 50.

FIG. 2 is an exploded, longitudinal section of the nurse tank coupling assembly 10, which includes the flow nozzle coupling 12, the flow nozzle 14, the locking collar 24, the nipple 32 and the fitting 16. The flow nozzle coupling 12 preferably has a generally cylindrical shape and an interior passage 46 defining an interior profile 48. The profile 48 is configured for receiving and slidable securing therein the flow nozzle 14. A recess defines a shoulder 52 which provides a stop for the flow nozzle 14. Acme threads 54 threadingly secure the coupling to the threads 40 of the nozzle 32. Grip castellations 44 are provided on the exterior of the coupling 12, and may also be knurled. An end periphery 56 defines an enlarged end portion of the exterior of the coupling 12 for slidably engaging the lock collar 24. Holes 56 are preferably blind holes which radially extend from the exterior surface defined by the end periphery 56 for receiving the pins 26 which slidably secure the lock collar 24 to the flow nozzle coupling 12. One or more holes 56 may be provided, which preferably corresponding the number of the pins 26 used for slidably securing the lock collar 24 to the coupling 12. The holes 56 are preferably angularly spaced apart equal angular distances about the circumference of the end periphery 56. Spaced apart from the holes 56 is a groove 60 for receiving the retainer ring 30. The groove 60 is preferably parallel to a circumferentially extending line along which the holes 56 are aligned about an outer circumference of the end periphery 56.

The flow nozzle 14 preferably has a cylindrical shape and has an interiorly disposed, longitudinally extending flow passage 64 and an exterior periphery 66. The periphery 66 is preferably configured for slidably securing within the profile 48 of the interior passage 46 of the coupling 12. The periphery 66 includes a protuberance 68 which laterally extends to engaging the shoulder 52 of the interior profile 48 of the coupling 12, such that the should 52 provides a stop for retaining and locating the flow nozzle 14 within the coupling 12. A polished seal surface is preferably defined on a first terminal end face 70 of the exterior periphery 66 of the flow nozzle 14 for sealingly engaging with the seal element 36.

The bias spring 28 preferably has cylindrical shape and is provided by a coil spring, but other resilient bias members may be used. The bias spring 28 preferably extends between the retaining ring 30 and an end of the lock collar 24 for urging the lock collar 24 to extend form the coupling 12 and engage the grip profile 34 of the nipple 32. The bias spring has an interior clearance 74 for receiving the end periphery 56 of the nozzle coupling 12.

The locking collar 24 preferably a ring which has a generally cylindrical and a first end which is open for slidably receiving the end periphery 56 of the nozzle coupling 12. The locking collar 24 has sidewalls 78 which are provided by a single cylindrical member. A second end of the locking collar 24 has locking section 80 which preferably has a smaller interior diameter than the first end. The locking section 80 has protuberances 82 which extend radially inward from the second end of the locking collar 24, preferably spaced apart equal angular distances about a longitudinal centerline 50 of the coupling assembly 10. The sidewalls 78 preferably have one or more locating slots 84 defined to extend through the sidewalls 78 and register with the pins 26 in the end periphery 56 of the nozzle coupling 12. The locating slots 84 are preferably configured as J-shaped slots which are closed, that is, without an open end, for locating the locking collar 24 in relation to the nozzle coupling 12 in a locked position and a released position. In the locked position, the locking collar 24 is disposed in a telescopically extended position relative to the locking collar 24, such that the locking collar 24 extends outward from the end periphery 56 of the nozzle coupling 12 a distance for engaging the grip profile 34 of the nipple 32 with the protuberances 82 of the locking section 80 to prevent rotation between the nipple 32, and the nozzle coupling 12 and the locking collar 24. In the released position, the locking collar 24 is disposed in a telescopically retracted position relative to the locking collar 24 from that shown in FIG. 1, such that the locking collar 24 is withdrawn from extending outward from the end periphery 56 of the nozzle coupling 12 the distance for engaging the grip profile 34 of the nipple 32, such that the grip profile 34 of the nipple 32 is not engaged by the protuberances 82 of locking section 80 and the locking collar 24 does not prevent rotation between the nipple 32, and the nozzle coupling 12 and the locking collar 24.

The nipple 32 is shown with the pipe threads 38 on the first end and the acme threads 40 on a the second end. The nipple 92 has a flow passage 92 extending longitudinally through the nipple 92. A seal retaining groove 92 circumferentially extends into the interior profile of the nipple 32 adjacent to an perpendicular with an annular-shaped seal seat 96. Together the seal seat 96 with the seal surface 70 on the end face of the flow nozzle 14 define a gland for sealingly engaging the seal element 36. The grip profile 34 preferably has a cross-section which is hexagonal shaped (See FIG. 4). In other embodiments the grip profile 34 may be of other shapes, such as polygonal with more or less than 6 sides, off-center, or elliptical shaped if the lock section 80 of the locking collar is provided with a corresponding shape for registering there-with and preventing rotation therebetween.

The nurse tank fitting 16 is shown having connector profiles 18, 20 and 22. The nurse tank fitting 16 may be provided by a housing for a valve assembly, or other type conventional fitting. The fitting 16 is shown as pipe Tee for illustrative purposes, and other types of fittings may be used in coupling the flow nozzle 14 to an anhydrous ammonia nurse tank.

FIG. 3 is a side elevation view of the locking collar 24. One of the locating slots 84 is shown. Two locating slots 84 are shown angularly spaced apart 180 degrees around the longitudinal axis 50. In other embodiments one or more of the locating slots 84 may be used, with the locating slots 84 preferably being angular spaced apart equal distances about the axis 50 when the locking collar is configured with more than one of the locating slots 84. Preferably, two or three of the locating slots 84 are used.

FIG. 4 is an end view of the locking collar 24, taken along section line 4-4 of FIG. 3, and FIG. 5 is a longitudinal section view of the locking collar, taken along section line 5-5 of FIG. 4. In FIG. 4 the grip profile 34 of the nipple 32 is shown in phantom. The protuberances 82 of the locking section section 80 are shown engaging the grip profile 34 to prevent rotation there-between. The protuberances 82 are shown as V-shaped, but in other embodiments the protuberances may be rounded, castelated, squared, or similar to an acme-thread profile. A small number of grooves and or protuberances may also be used.

The present invention provides advantages of a locking collar which is biased into a telescoped, engagement position to prevent rotation between a coupling for a flow nozzle and a fitting for an anhydrous ammonia nurse tank. This prevents the coupling from loosening inadvertently releasing anhydrous ammonia to the atmosphere.

Although the preferred embodiment has been described in detail, it should be understood that various changes, substitutions and alterations can be made therein without departing from the spirit and scope of the invention as defined by the appended claims.

What is claimed is:

1. A nurse tank coupling assembly, comprising:
   a fitting having one end connected to a supply of anhydrous ammonia, and a second end having a connector profile;
   a nipple having a first end connected to said connector profile, and sealing engaging with said connector profile, said nipple having a grip profile disposed exteriorly thereon, and a second end disposed distal from said first end said grip profile disposed between said first and said second end;
   a flow nozzle for engaging with said second end of said nipple;
   a seal element extending between said second end of said nipple and said flow nozzle, and sealingly engaging there-between;

a nozzle coupling extending over said flow nozzle and threadlingly engaging said second end of said nipple, with said flow nozzle secured between said nozzle coupling and said nipple;

a locking collar slidably disposed on said nozzle coupling, for moving from a retracted position disposed aside of said grip profile of said nipple to an extended position disposed adjacent said grip profile and non-rotatably securing said locking collar to said nipple;

wherein said locking collar is non-rotatably secured to said nozzle coupling when disposed in said extended position, and non-rotatably secures said nozzle coupling to said nipple when disposed in said extended position; and wherein said locating slot is configured with a profile of a J-slot.

2. The nurse tank coupling assembly according to claim 1, wherein a pin extends between said locking collar and said nozzle coupling for non-rotatably securing said locking collar to said nozzle coupling when said locking collar is disposed in said extended position.

3. The nurse tank coupling assembly according to claim 2, wherein a locating slot extends in one of said locking collar and said nozzle coupling for receiving said pin, with said locating slot configured for non-rotatably securing said locking collar to said nozzle coupling when disposed in said extended position.

4. The nurse tank coupling assembly according to claim 1, a bias member disposed between said nozzle coupling and said locking collar for urging said nozzle coupling to move from said retracted to said extended position.

5. The nurse tank coupling assembly according to claim 1, wherein said nozzle coupling is threadingly secured to said nipple with acme threads.

6. The nurse tank coupling assembly according to claim 1, wherein said grip profile of said nipple defines a hexagonal shaped profile which circumferentially extends about a longitudinal axis of said nipple, said locking collar has an interior profile having protuberances which define a locking section, and when said locking collar is disposed in said extended position said protuberances engage said hexagonal shaped profile of said grip profile of said nipple to non-rotatably secure said locking collar to said nipple; and wherein when said locking collar is disposed in said retracted position said protuberances are disposed aside of said hexagonal shaped profile of said grip profile of said nipple and said locking collar is rotatable relative to said nipple.

7. A nurse tank coupling assembly, comprising:

a fitting having one end connected to a supply of anhydrous ammonia, and a second end having a connector profile;

a nipple having a first end connected to said connector profile, and sealing engaging with said connector profile, said nipple having a grip profile disposed exteriorly thereon, and a second end disposed distal from said first end said grip profile disposed between said first and said second end;

a flow nozzle for engaging with said second end of said nipple;

a seal element extending between said second end of said nipple and said flow nozzle, and sealingly engaging there-between;

a nozzle coupling extending over said flow nozzle and threadlingly engaging said second end of said nipple, with said flow nozzle secured between said nozzle coupling and said nipple;

a locking collar slidably disposed on said nozzle coupling, for moving from a retracted position disposed aside of said grip profile of said nipple to an extended position disposed adjacent said grip profile and non-rotatably securing said locking collar to said nipple;

a pin extending between said locking collar and said nozzle coupling for non-rotatably securing said locking collar to said nozzle coupling when said locking collar is disposed in said extended position;

a locating slot extending in one of said locking collar and said nozzle coupling for receiving said pin, wherein said locating slot is configured for said locking collar being at least partially rotatable relative to said nozzle coupling when said nozzle coupling is disposed in said retracted position, and for non-rotatably securing said locking collar to said nozzle coupling when said locking collar is disposed in said extended position, to thereby non-rotatably secures said nozzle coupling to said nipple;

a bias member disposed between said nozzle coupling and said locking collar for urging said nozzle coupling to move from said retracted to said extended position; and wherein said locating slot is configured with a profile of a J-slot.

8. The nurse tank coupling assembly according to claim 7, wherein said nozzle coupling is threadingly secured to said nipple with acme threads.

9. The nurse tank coupling assembly according to claim 7, wherein said grip profile of said nipple defines a hexagonal shaped profile which circumferentially extends about a longitudinal axis of said nipple, said locking collar has an interior profile having protuberances which define a locking section, and when said locking collar is disposed in said extended position said protuberances engage said hexagonal shaped profile of said grip profile of said nipple to non-rotatably secure said locking collar to said nipple; and wherein when said locking collar is disposed in said retracted position said protuberances are disposed aside of said hexagonal shaped profile of said grip profile of said nipple and said locking collar is rotatable relative to said nipple.

10. A nurse tank coupling assembly, comprising:

a fitting having one end connected to a supply of anhydrous ammonia, and a second end having a connector profile;

a nipple having a first end threadlingly secured to said connector profile, and sealing engaging with said connector profile, said nipple having a grip profile disposed exteriorly thereon, and a second end disposed distal from said first end said grip profile disposed between said first and said second end, said second end having exteriorly disposed acme threads;

a flow nozzle for engaging with said second end of said nipple;

a seal element extending between said second end of said nipple and said flow nozzle, and sealingly engaging there-between;

a nozzle coupling extending over said flow nozzle and having an interiorly disposed acme threads configured for engaging said exteriorly disposed acme threads of said nipple, with said flow nozzle secured between said nozzle coupling and said nipple;

a locking collar slidably disposed on said nozzle coupling, for moving from a retracted position disposed aside of said grip profile of said nipple to an extended position disposed adjacent said grip profile and non-rotatably securing said locking collar to said nipple;

a pin extending between said locking collar and said nozzle coupling for non-rotatably securing said locking collar to said nozzle coupling when said locking collar is disposed in said extended position;

a locating slot extending in one of said locking collar and said nozzle coupling for receiving said pin, wherein said locating slot is configured with a J-slot profile for said locking collar being at least partially rotatable relative to said nozzle coupling when said nozzle coupling is disposed in said retracted position, and for non-rotatably securing said locking collar to said nozzle coupling when said locking collar is disposed in said extended position, to thereby non-rotatably secures said nozzle coupling to said nipple; and a bias member disposed between said nozzle coupling and said locking collar for urging said nozzle coupling to move from said retracted to said extended position.

11. The nurse tank coupling assembly according to claim 10, wherein said grip profile of said nipple defines a polygonal shaped profile which circumferentially extends about a longitudinal axis of said nipple, said locking collar has an interior profile having protuberances which define a locking section, and when said locking collar is disposed in said extended position said protuberances engage said polygonal shaped profile of said grip profile of said nipple to non-rotatably secure said locking collar to said nipple; and wherein when said locking collar is disposed in said retracted position said protuberances are disposed aside of said polygonal shaped profile of said grip profile of said nipple and said locking collar is rotatable relative to said nipple.

12. The nurse tank coupling assembly according to claim 10, wherein said polygonal shaped profile of said grip profile is of a hexagonal shape.

* * * * *